United States Patent [19]

Natarajan et al.

[11] Patent Number: 4,929,514

[45] Date of Patent: May 29, 1990

[54] THIN FILM MEDIA FOR HIGH DENSITY LONGITUDINAL MAGNETIC RECORDING

[75] Inventors: Bangalore R. Natarajan, Cupertino; Robert G. Walmsley, Palo Alto, both of Calif.

[73] Assignee: Hewlett-Packard Company, Palo Alto, Calif.

[21] Appl. No.: 171,587

[22] Filed: Mar. 22, 1988

[51] Int. Cl.⁵ .............................................. H01F 10/00
[52] U.S. Cl. ..................... 428/611; 428/622; 428/627; 428/632; 428/667; 428/668; 428/680; 428/928; 427/131
[58] Field of Search ............... 428/611, 621, 622, 627, 428/632, 651, 666, 667, 668, 680, 900, 928; 427/131, 132

[56] References Cited

U.S. PATENT DOCUMENTS

| | | | |
|---|---|---|---|
| 4,610,911 | 9/1986 | Opfer et al. | 428/213 |
| 4,652,499 | 3/1987 | Howard | 428/641 |
| 4,654,276 | 3/1987 | Ahlert et al. | 428/641 |
| 4,774,130 | 9/1988 | Endo et al. | 427/131 |
| 4,789,598 | 12/1988 | Howard et al. | 428/670 |

FOREIGN PATENT DOCUMENTS 59-88806  5/1984  Japan .

*Primary Examiner*—Upendra Roy
*Assistant Examiner*—George Wyszomierski

[57] ABSTRACT

A magnetic thin film materials system (10, 10') is provided, comprising a thin magnetic film (16) formed on a non-magnetic underlayer (14) formed on a substrate (12). In particular, the magnetic film comprises a composition consisting essentially of CoCrPt, with Cr ranging from about 10 to 20 at %, Pt ranging from about 1 to 20 at % and the balance Co. The underlayer consists essentially of chromium. The magnetic layer ranges in thickness from about 200 to 1,200 Å, while the non-magnetic underlayer ranges in thickness from about 500 to 5,000 Å. The platinum control film coercivity, while chromium provides corrosion resistance. In addition, chromium controls the recorded magnetic transition noise properties. An increase in Cr content in these alloys beyond about 10 at % increases the corrosion resistance and unexpectedly lowers the transition noise significantly. Coercivities of from about 500 to greater than 2,000 Oe and magnetization-thickness products from 1 to $6 \times 10^{-3}$ emu/cm² are attained by the magnetic recording system of the invention. A thin carbon wear layer (18) (about 200 to 800 Å) is provided over the magnetic layer, with an optional thin chromium adhesion layer (20) (0 to about 500 Å) interposed therebetween.

23 Claims, 8 Drawing Sheets

THIN FILM MEDIA FOR HIGH DENSITY LONGITUDINAL MAGNETIC RECORDING

TECHNICAL FIELD

The present invention relates to magnetic recording media or discs, and, in particular, to a magnetic disc structure which is characterized by having excellent magnetic recording and wear properties, together with stability against oxidation of the magnetic layer. Specifically, the invention relates to a novel combination of material, each in a thin film form, constituting a magnetic recording disc. Moreover, the invention relates to methods for forming magnetic materials and controlling the magnetic properties thereof so as to provide magnetic recording media having magnetic properties which are selectively variable over a desirable range in order to facilitate optimization of recording system design.

BACKGROUND ART

In designing a magnetic recording disc, there are a number of factors, depending upon the properties of available recording heads, that must be considered and provided for. Among the magnetic properties that are desirable, especially where high magnetic recording density is an object, is a high coercivity limited only by the write capability of the recording head. The recording system also requires that the head signal output of the recording head be greater than some minimum value. It is required in turn for thin recording films that the product of the magnetic recording film thickness and its remanent mangetization (hereinafter referred to as the magnetization-thickness product) be greater than some corresponding minimum value. In addition, the high coercivity and desired magnetization-thickness product should be accompanied by a high degree of squareness of the M-H hysteresis loop of the magnetic film.

With the given values of coercivity and magnetization-thickness product established, the recording density is desirably the maximum value that is consistent with the minimum value of resolution for the recording process. Because resolution generally decreases both with increasing recording density and with an increasing value of the ratio of the magnetization-thickness product to coercivity, optimization of the recording system requires that the disc coercivity and its magnetization-thickness product be essentially the corresponding maximum and minimum values established above. Any value of magnetization-thickness product greater than its minimum value and any value of coercivity less than its maximum value necessarily results in a recording density less than what would otherwise be achievable with the recording head.

Hence, there exists a need to vary the coercivity and magnetization-thickness product independently. Further, the values of these parameters need to change as improved recording heads become available and there is, therefore, an additional need for independent variability of coercivity and magnetization-thickness product over a rather large range of values.

Another important constraint is that the necessary independent variability of magnetic properties be achievable on smooth substrates which are suitable for use as the mechanical support for the recording disc. It is also desirable that once a process to achieve targeted or predetermined magnetic properties is in place, minor independent adjustments to the magnetic properties can be readily made by means of relatively easy and straight forward changes in process parameters.

U.S. Pat. No. 4,610,911, issued to James E. Opfer et al and assigned to the same assignee as the present appication, provides a solution to the foregoing needs. In that patent, a magnetic layer of an alloy of cobalt and platinum (about 1 to 20 at% Pt) is deposited on a chromium underlayer. The platinum content in the magnetic film is varied so as to provide a magnetic film with a desired coercivity which is significantly less dependent upon film thickness. This permits the cobalt-platinum film thickness to be adjusted to meet a wide range of recording system design parameters. The coercivity of the magnetic film may be determined primarily by the amount of platinum in the alloy and the saturation magnetization-thickness product of the film is determined primarily by the film thickness.

U.S. Pat. No. 4,652,499 is directed to a magnetic recording medium with a chromium alloy underlayer and a cobalt-based magnetic layer. In particular, an improved cobalt-platinum (CoPt) thin film metal alloy media for longitudinal magnetic recording has a squareness greater than prior CoPt thin metal alloy media. An underlayer of a body-centered-cubic (BCC) chromium-based alloy with a lattice constant greater than chromium, such as chromium-vanadium, is formed between the substrate and the CoPt magnetic layer. The underlayer also improves the magnetic properties of the media when the magnetic layer is an alloy of cobalt-platinum-chromium (CoPtCr). A comparison of magnetic properties of $(Co_{85}Pt_{15})_{93.5}Cr_{6.5}$ on various substrates (Cr; $Cr_{80}V_{20}$) is shown. A slight improvement using the CrV underlayer is noted. Specifically, a coercivity of 1420 Oe is listed, along with a magnetization-thickness product of $2.75 \times 10^{-3}$ emu/cm$^2$, a squareness ratio ($M_r/M_s$) of 0.90, and a coercivity squareness ratio (S*) of 0.906. However, this composition is not expected to provide good corrosion resistance and reduced noise.

U.S. Pat. No. 4,654,276 is directed to a magnetic recording medium with an underlayer and a cobalt-based magnetic layer. In this patent, a tungsten (W) underlayer is used to increase the coercivity of CoPt or CoPtCr magnetic layers, especially where the tungsten underlayer and the magnetic layer are deposited so as to form an intermetallic compound, Co$_3$W, at the interface between the two layers. In this patent, the chromium content in the CoPtCr alloy is 20 at% and the platinum content is 8 at%. A film 1000 Å thick evidenced a coercivity of 970 Oe, a coercivity squareness (S*) of 0.89, and a remanence-thickness product of $1.68 \times 10^{-3}$ emu/cm$^2$. However, tungsten presents manufacturability problems, due to poor adhesion resulting from high stress. Further, the coercivity of the combination is about 50% less than that obtained with a chromium underlayer for a given Co-Pt-Cr composition and thickness.

Japanese Application No. 198568/82 (Laid-Open No. 88806/84), laid-open May 22, 1984, is directed to a magnetic memory comprising a magnetic alloy of CoPtCr or CoPtTa on a non-magnetic underlayer of a nickel-phosphorus alloy or aluminum oxide. The chromium content may range from about 1 to 17 at%, while the platinum content ranges from about 9 to 35 at%. A coercivity of 500 to 1200 Oe is obtained, along with a squareness ratio ($B_r/B_s$) of 0.7 to 0.9, a coercivity squareness (S*) of 0.7 to 0.9. However, higher platinum concentrations require greater thickness of the magnetic layer to achieve reasonable magnetic recording properties.

The foregoing latter three references lack one or more of the desirable properties needed for improved magnetic recording media, including such attributes as magnetic properties, recording performance, corrosion resistance, and manufacturability constraints. Further, the thickness of magnetic layers used in magnetic recording needs to be kept as low as possible to provide a strong head field gradient, which will yield a sharper magnetic transition, an aspect not addressed by the three references. Accordingly, a need remains to develop a magnetic recording medium having the requisite characteristics described above, employing convenient processing conditions.

DISCLOSURE OF INVENTION

In accordance with the invention, a magnetic thin film materials system is provided, comprising a thin magnetic film formed on a non-magnetic underlayer. In particular, the magnetic film comprises a composition consisting essentially of CoCrPt, with chromium present in an amount ranging from about 10 to 20 at% platinum in an amount ranging from about 1 to 20 at%, and the balance cobalt. The underlayer consists essentially of chromium. The magnetic layer ranges in thickness from about 200 to 1,200 Å, while the non-magnetic underlayer ranges in thickness from about 500 to 5,000 Å.

A thin carbon wear layer (about 200 to 800 Å) may be provided over the magnetic layer, with an optional thin chromium adhesion layer (up to about 500 Å) interposed therebetween.

The platinum controls film coercivity, while chromium provides corrosion resistance. In addition, chromium controls the recorded magnetic transition noise properties. Coercivities in the range from about 500 to 2,000 Oe and magnetization-thickness products from about 1 to $6 \times 10^{-3}$ emu/cm$^2$ are attained by the magnetic recording system of the invention.

BEST MODES FOR CARRYING OUT THE INVENTION

In accordance with the invention, a magnetic thin film materials system is provided which possesses recording properties suitable for very high linear density, longitudinal recording applications, together with superior corrosion resistance. The linear density achieved with the material system of the invention exceeds 30,000 flux reversals per inch (FRPI). This translates into usable recording linear density of 45,000 bits per inch (BPI) or more, depending on the choice of signal coding scheme used.

The magnetic thin film disc is fabricated by a sequential sputter-deposition of a thin (about 500 to 5,000 Å) non-magnetic chromium underlayer onto a non-magnetic thin film disc substrate, followed by a thin (about 200 to 1200 Å) magnetic film of Co-Cr-Pt ternary alloy system, an optional thin adhesion layer (up to about 500 Å), and a thin wear layer (about 200 to 800 Å).

The disc substrate may comprise any material with sufficient mechanical strength for rigid disc applications, which can be polished to the required surface finish, and is compatible with high vacuum processing. Examples of suitable substrates include aluminum, electroless NiP-plated aluminum, alumina-coated aluminum, glass, ceramic, single crystal silicon, poly-crystalline silicon, and the like.

The wear layer may comprise one or more of carbon or any of the oxides, nitrides, and carbides of silicon, titanium, tantalum, niobium, hafnium, zirconium, vanadium, molybdenum, and tungsten.

The adhesion layer may comprise one or more of chromium, titanium, zirconium, hafnium, vanadium, molybdenum, and niobium.

Figure 1A:
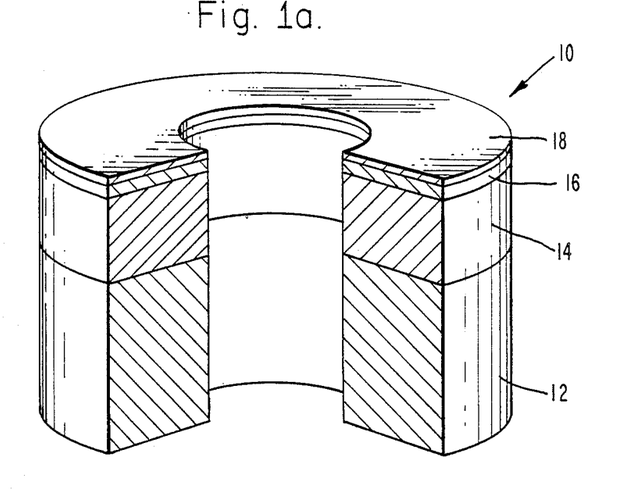
FIGS. 1a and 1b are cross-sectional views of alternate embodiments of thin film disc structures in accordance with the invention.
Figure 1B:
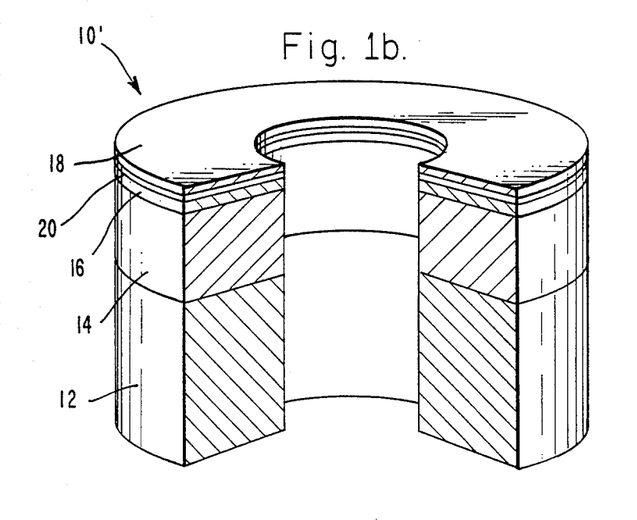

A cross-sectional view of the novel thin film disc structure of the invention is shown in FIG. 1. Both three (FIG. 1a) and four (FIG. 1b) layer structures of the new materials system are shown. In FIG. 1a, the thin film disc structure 10 of the invention comprises substrate 12, chromium isolation layer 14, Co-Cr-Pt magnetic layer 16, and wear layer 18. As shown in FIG. 1b, the thin film disc structure 10' of the invention includes an adhesion layer 20, such as chromium, inserted between the magnetic layer 16 and the wear layer 18 to enhance adhesion of the wear layer and to protect the magnetic layer from reaction during wear layer processing, that is, to prevent oxidation of the magnetic layer during deposition of the wear layer in oxygen. In the embodiment disclosed herein, however, the need for the adhesion layer 20 is not essential, since use of a carbon wear layer, which is deposited in an inert argon atmosphere, will adequately adhere to the Co-Cr-Pt layer due to the significant amount of Cr in the magnetic alloy.

The ternary Co-Cr-Pt system of the invention is defined by a chromium concentration ranging from about 10 to 20 at% and by a platinum concentration ranging from about 1 to 20 at%, the balance being cobalt. Platinum in this system controls the film coercivity, while chromium provides the corrosion resistance and improved recording performance. The chromium in the alloy controls the noise properties of the recorded magnetic transitions and hence the signal-to-noise ratio (SNR) achievable in a recording system, as seen in Table I, below. It appears that this added benefit is derived by alteration of the micromagnetics of the Co-Cr-Pt alloy film by Cr. Increasing Cr content in the alloy increases the corrosion resistance and decreases magnitude of noise from recorded transitions. Thus, the coercivity and corrosion resistance with improved recording performance of the ternary magnetic film can be individually adjusted by varying Pt and Cr content, respectively, in the alloy. The magnetic performance can be further enhanced by adjusting the thickness of the Cr underlayer.

In its preferred embodiment, the invention contemplates use of an underlayer 12 of chromium, ranging in thickness from about 1,500 to 3,000 Å, and most preferably is about 2,000 Å, a magnetic layer 16 of Co-Cr-Pt ranging in thickness from about 500 to 1,000 Å, and most preferably is about 600 Å, and a carbon wear layer 18 ranging in thickness from about 200 to 500 Å, and most preferably is about 400 Å. The chromium content of the Co-Cr-Pt layer 16 preferably ranges from about 14 to 16 at%, and most preferably is about 15 at%, while the platinum content of this layer preferably ranges from about 3 to 10 at%, and most preferably is about 4 at%.

The thin film structure 10, 10' is produced by sequential diode or magnetron sputter deposition of each layer onto a suitable substrate in an pure Ar ambient. For example, chromium may be deposited from a DC magnetron source at Ar pressures ranging from 2 to 20 mTorr and at rates from 200 to 2,500 Å per minute; typical deposition values are 5 mTorr and 1,500 Å/min.

The magnetic layer may be deposited from an RF diode source employing a composite target comprising a base of Co-Cr with an attached Pt ring, as described in U.S. Pat. No. 4,448,050. The Ar pressures range from 8 to 20 mTorr and at rates from 150 to 600 Å/min.; typical deposition values are 10 mTorr and 300 Å/min.

The carbon overcoat may be deposited by DC magnetron deposition at Ar pressures ranging from 2 to 10 mTorr and at rates from 150 to 400 Å/min.; typical values are 5 mTorr and 300 Å/min.

The magnetic and corrosion properties of the Co-Cr-Pt ternary alloy films deposited on a freshly sputter-deposited Cr film are found to be independent of the underlying thin film disc substrate material type. The first Cr layer provides adequate isolation for the Co-Cr-Pt magnetic film from possible substrate contamination or surface inhomogeneities, as well as any undesired expitaxial effects. Hence, the materials system of the invention may be sputter-deposited over various types of thin film disc substrates, such as those indicated above, for optimizing the thin film media recording performance, wear and friction reliability, and manufacturing cost.

In a given recording system, independent control over the coercivity ($H_c$) and the remanent magnetization-thickness product ($M_r t$) of the thin film is desirable, since high $H_c$ and lower $M_r t$ results in higher recorded density. Generally, the maximum usable $H_c$ is limited by the head write current and the minimum $M_r t$ is determined by the signal-to-noise ratio (SNR) of the recording system. Hence, as head design improves, it is essential to match the $H_c$ and $M_r t$ of the disc with the write capabilities of the head to achieve higher recording densities.

Figure 2:
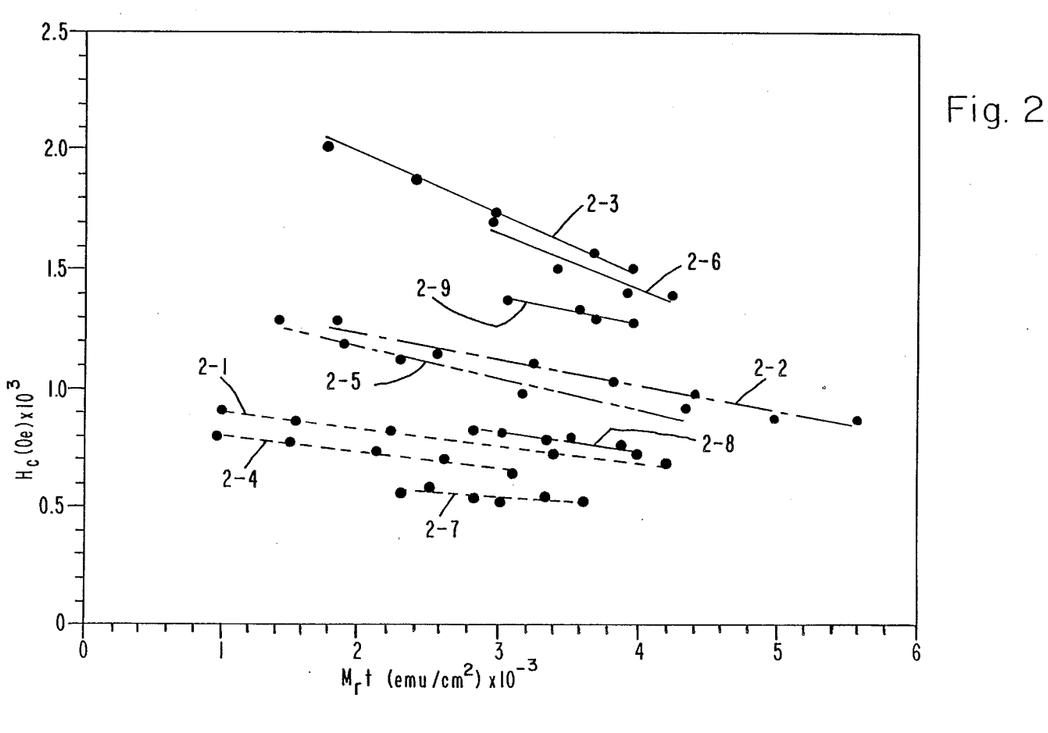
FIG. 2, on coordinates of Oersteds and emu/cm$^2$, is a plot of the dependence of coercivity on magnetization-thickness product ($M_rt$) for Co-Cr-Pt alloys with 10 to 20 at% Cr and 0 to 9 at% Pt.

A typical variation of coercivity as a function of $M_r t$ for various Co-Cr-Pt alloy compositions, deposited on a Cr underlayer of the same thickness (3,000 Å for each alloy composition), is shown in FIG. 2. The coercivity variations for three Co-Cr compositions (Co-10 at% Cr, Co-15 at% Cr, Co-20 at% Cr) having 0, 4, and 9 at% Pt are shown in FIG. 2. In particular, the curves in FIG. 2 relate to the compositions as follows:

| | |
|---|---|
| 2-1 | Co-10 at % Cr-0 at % Pt |
| 2-2 | Co-10 at % Cr-4 at % Pt |
| 2-3 | Co-10 at % Cr-9 at % Pt |
| 2-4 | Co-15 at % Cr-0 at % Pt |
| 2-5 | Co-15 at % Cr-4 at % Pt |
| 2-6 | Co-15 at % Cr-9 at % Pt |
| 2-7 | Co-20 at % Cr-0 at % Pt |
| 2-8 | Co-20 at % Cr-4 at % Pt |
| 2-9 | Co-20 at % Cr-9 at % Pt. |

It is evident from FIG. 2 that the coercivity of the ternary Co-Cr-Pt alloy films is controlled predominately by the amount of Pt in the alloy. Addition of Cr to the alloy slightly decreases the coercivity. However, since the effect of Pt is much more than Cr, the coercivity of Co-Cr-Pt alloy films can be made nearly independent of the Cr content in the alloy. Also, as is apparent from FIG. 2, for any Co-Cr-Pt ally film composition with a given remanent magnetization ($M_r$), the coercivity decreases with increase in the thickness of the alloy film.

Figure 3:
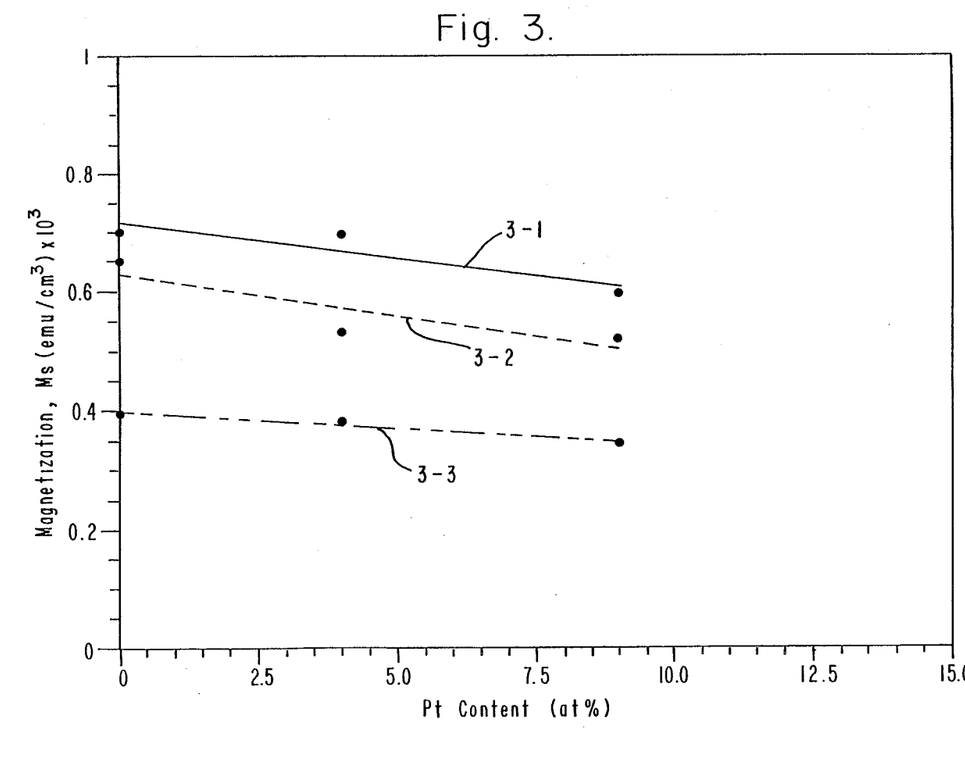
FIG. 3, on coordinates of emu/cm$^3$ and atomic percent, is a plot of saturation magnetization as a function of Pt and Cr content.

In the Co-Cr-Pt alloys films of the invention, saturation magnetization decreases with the addition of nonmagnetic Cr and Pt elements to magnetic Co, as shown in FIG. 3. Furthermore, the magnetization of the Co-Cr-Pt alloy is found to decrease more rapidly with Cr addition than with Pt addition. In FIG. 3, the curves are associated with the various compositions as follows:

| | |
|---|---|
| 3-1 | Co-10 at % Cr-Pt |
| 3-2 | Co-15 at % Cr-Pt |
| 3-3 | Co-20 at % Cr-Pt. |

In longitudinal magnetic recording applications with a given recording head design, it is essential to maximize the coercivity and minimize the $M_r t$ value for achieving a high linear density. In addition, the magnetic layer thickness needs to be thin in order to achieve good overwrite recording performance by allowing the complete penetration of the magnetic fields generated by the recording heads during writing. Thus, in the preferred embodiment of the invention, the Pt and Cr content in the ternary alloy is minimized while optimizing the coercivity, corrosion resistance, and recording performance. This is due to the fact that both the $M_r t$ and the magnetic layer thickness should be kept as los as possible for achieving higher linear density while maintaining good recording performance. Hence, to fit a particular set of design criteria of a recording system, a desired value of $H_c$ and $M_r T$ must be adjusted by both the composition and thickness of the Co-Cr-Pt alloy films.

Figure 4A:
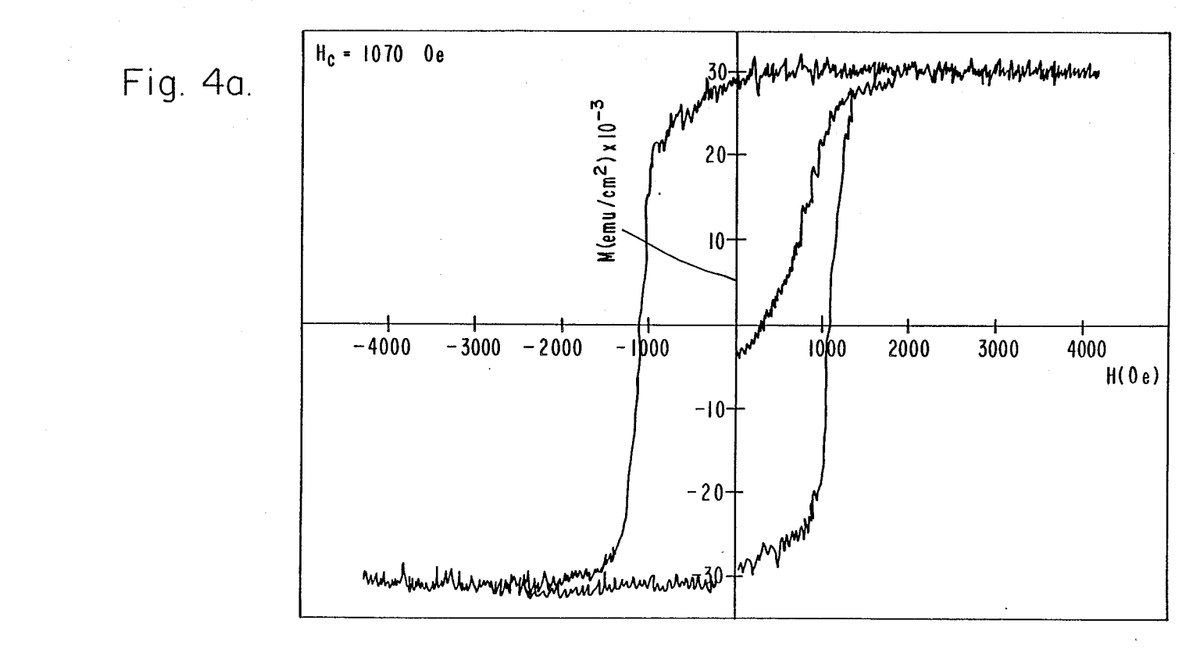
FIGS. 4a and 4b, on coordinates of magnetization in emu/cm$^3$ and coercivity in Oersteds, are in-plane M-H loop plots for Co-Cr-Pt disc structures with coercivities of 1,070 Oe (FIG. 4a) and 1,700 Oe (FIG. 4b)
Figure 4B:
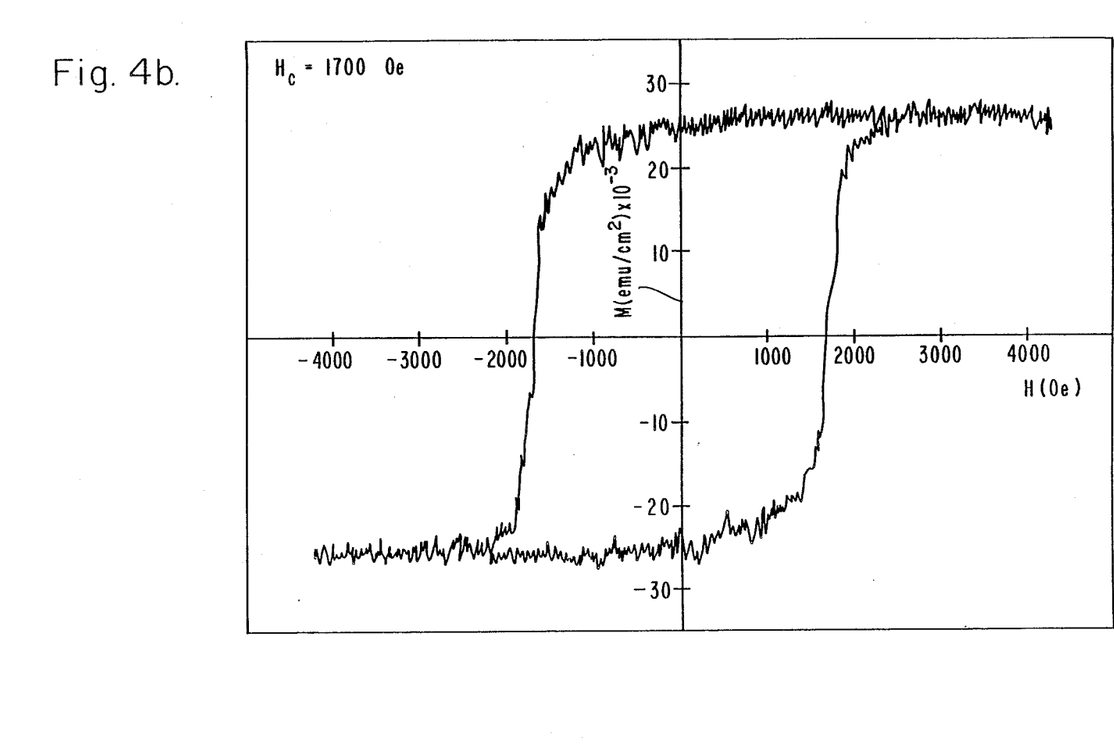

Typical in-plane M-H loop plots for the Co-Cr-Pt/Cr disc materials structures with coercivities of about 1,000 Oe and about 1,700 Oe are shown in FIGS. 4a and 4b, respectively. It is evident from the plots that the M-H loop shape does not change significantly when more Pt is added to the Co-Cr-Pt alloy film to increase its coercivity. A high in-plane M-H loop squareness (S, S*) coupled with sharp loop corners is essential for obtaining high linear density in longitudinal magnetic recording applications. Co-Cr-Pt alloy films with a coercivity greater than about 2,000 Oe with good loop squareness can be obtained by further increasing the Pt content. Although such high coercivities can be obtained in the Co-Pt system, other magnetic parameters, including squareness, are found to degrade to an unacceptable level. It is evident from FIGS. 2 and 4 that the Co-Cr-Pt materials system of the invention is an excellent one for very high density recording applications.

Figure 5:
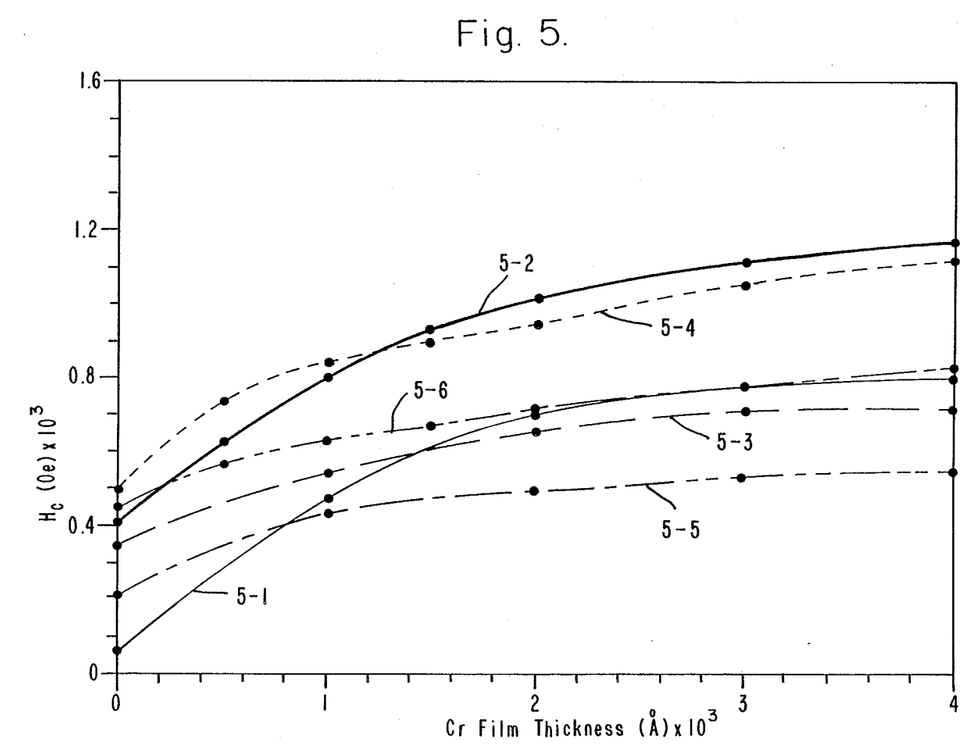
FIG. 5, on coordinates of Oersteds and Angstrom units, is a plot of coercivity as a function of Cr underlayer film thickness for Co-Cr-Pt alloys containing 10 to 20 at% Cr and 0 to 4 at% Pt.

As is true for pure Co and Co alloy thin films such as Co-Pt, Co-Ni, Co-Re, Co-Cr, Co-Ni-Cr, and the like, the magnetic properties of the Co-Cr-Pt films can be further improved by depositing the magnetic alloy film over a freshly sputter-deposited Cr film. The Cr underlayer has been found to alter the physical structure of the Co alloy films (deposited on top) by initiating pseudo-epitaxial growth. The crystal phase, crystal orientation, and grain size of the Co alloy films are affected by the Cr underlayer. FIG. 5 shows the variation of coercivity as a function of Cr underlayer thickness for three binary Co-Cr alloy compositions (Co-10 at% Cr, Co-15 at% Cr, Co-20 at% Cr) and three ternary Co-Cr-Pt alloy compositions (Co-10 at% Cr-4 at% Pt, Co-15 at% Cr-4 at% Pt, Co-20 at% Cr-4 at% Pt). In particular, the curves in FIG. 5 relate to the compositions as follows:

| 5-1 | Co-10 at % Cr-0 at % Pt |
|---|---|
| 5-2 | Co-10 at % Cr-4 at % Pt |
| 5-3 | Co-15 at % Cr-0 at % Pt |
| 5-4 | Co-15 at % Cr-4 at % Pt |
| 5-5 | Co-20 at % Cr-0 at % Pt |
| 5-6 | Co-20 at % Cr-4 at % Pt. |

As expected, the coercivity of both Co-Cr and Co-Cr-Pt alloy films increases with Cr underlayer film thickness. This is due to an increase in grain size of the subsequently-deposited Co-Cr and Co-Cr-Pt alloy films, which results in higher coercivity of the magnetic film. In addition, as is evident from FIG. 5, for the same film thickness of Cr underlayer, the addition of Pt to Co-Cr alloys increases the coercivity of the magnetic film. The effectiveness of Cr in fine-tuning the magnetic properties of the Co-Cr-Pt films decreases for high Pt content alloys. The coercivity of alloys with greater than about 10 at% Pt is primarily controlled by the Pt content, as desribed above.

Figure 6:
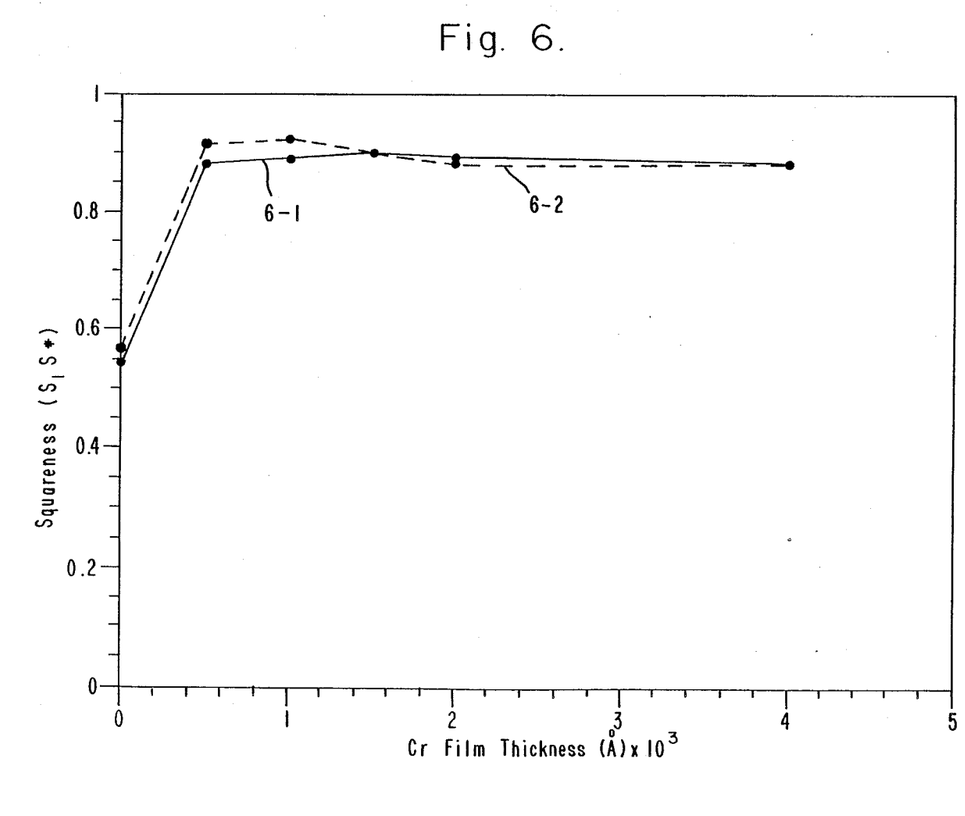
FIG. 6 is a plot of the dependence of magnetization squareness ratio (S) and the coercivity squareness ratio (S*) as a function of Cr underlayer film thickness for a typical Co-Cr-Pt alloy film.

Another effect of the Cr underlayer is to orient the c-axis of the hexagonal Co alloy films parallel to the film plane by promoting pseudo-epitaxial growth of the Co alloy film. The result of this effect is to increase the in-plane M-H loop squareness (both S and S*) as shown in FIG. 6. Typical variations of S (Curve 6-1) and S* (Curve 6-2) as a function of Cr underlayer film thickness for Co-15 at% Cr-4 at% Pt alloy films are shown in FIG. 6. High in-plane S and S* values are essential for achieving high linear density in longitudinal magnetic recording. As seen in FIG. 6, a Cr underlayer of only 500 A is sufficient to provide an effective epitaxial seed layer. As expected, further increase in Cr underlayer thickness does not enhance the M-H loop squareness of Co-Cr-Pt alloy films.

Excellent coorosion resistance is exhibited by Co-Cr-Pt filmss containing at least about 10 at% Cr. In air or aqueous media, Cr forms a stable oxide or oxyhydroxide layer which provides an effective barrier to further oxidation (corrosion). Additions of Cr to less resistant (passive) metals can bestow on the alloy, corrosion resistance similar to pure Cr. The dependence of corrosion resistance on Cr content in an alloy typical manifests a threshold effect. For example, Fe-Cr alloys with greater than about 12 at% Cr behave in a like manner to pure Cr.

Cobalt, the basis element for most current thin film magnetic media, is not intrinsically a corrosion resistant metal. The oxide or other film formed by a metal, in order to be protective, must be coherent, continuous, insoluble in aqueous media, and have low ionic and/or electronic conductivity. The oxides and oxyhydroxides of cobalt do not meet these criteria.

Characterization of corrosion performance was accomplished by an aqueous electrochemical method which measures the AC impedance response of a thin film media structure on a standard electroless NiP-plated Al disc. Measurement of corrosion performance by wet aqueous methods is justified by empirical correlation with accelerated atmospheric test results and because, at ambient temperatures, atmospheric corrosion is known to be water mediated. The AC impedance technique employed a three-electrode electrochemical cell, a potentiostat, a Hewlett-Packard HP3562A Dynamic Signal Analyzer, and selected electrolytes. This apparatus is described elsewhere and forms no part of this invention; see, e.g., I. Epelboin et al, J. Appl. Electrochem., Vol. 2, p. 71 (1972); W. J. Lorenz et al, Corros. Sci., Vol. 21, No. 9, p. 647 (1981); and F. Mansfeld et al, Corrosion, Vol. 38, No. 11, p. 570 (1982). Sulfur- and chlorine-containing pollutants are known to be the most detrimental with respect to atmospheric corrosion; see, e.g., D. W. Rice et al, J. Electrochemical Soc., Vol. 1126, No. 9, p. 1459 (1979). Alloy sensitivity to these pollutants is also known to vary widely. Hence, Sulfate- and chloride-containing electrolytes were selected and grouped as less aggressive (0.4N $K_2SO_4$; 0.4N NaCl) and more aggressive (0.1N $H_2SO_4$; pH 2 KCl).

The electrochemical cell exposes a 1 $cm^2$ area of a complete disc to the electrolyte. The AC impedance response is measured at the open circuit potential of the corroding electrode (i.e., the disc). Measurements were made 60 seconds and 10 minutes after exposure to the electrolyte. By appropriate manipulation of the impedance data, the polarization or transfer resistance is obtained, as is known from the first three references listed in the previous paragraph. This resistance value is inversely proportional to the instantaneous corrosion current as per the Stern-Geary relations; see, e.g., M. Stern et al, J. Electrochemical Soc., Vol. 104, p. 56 (1957). By assuming anodic and cathodic Tafel slopes of 0.1, the corrosion current per $cm^2$ can be calculated with a probable error of less than a factor of two. After exposure to the electrolyte, the disk surface could be tested for recording defects in order to ensure that the results of impedance measurements were consistent with the number of defects generated in the exposed area.

Figure 7:
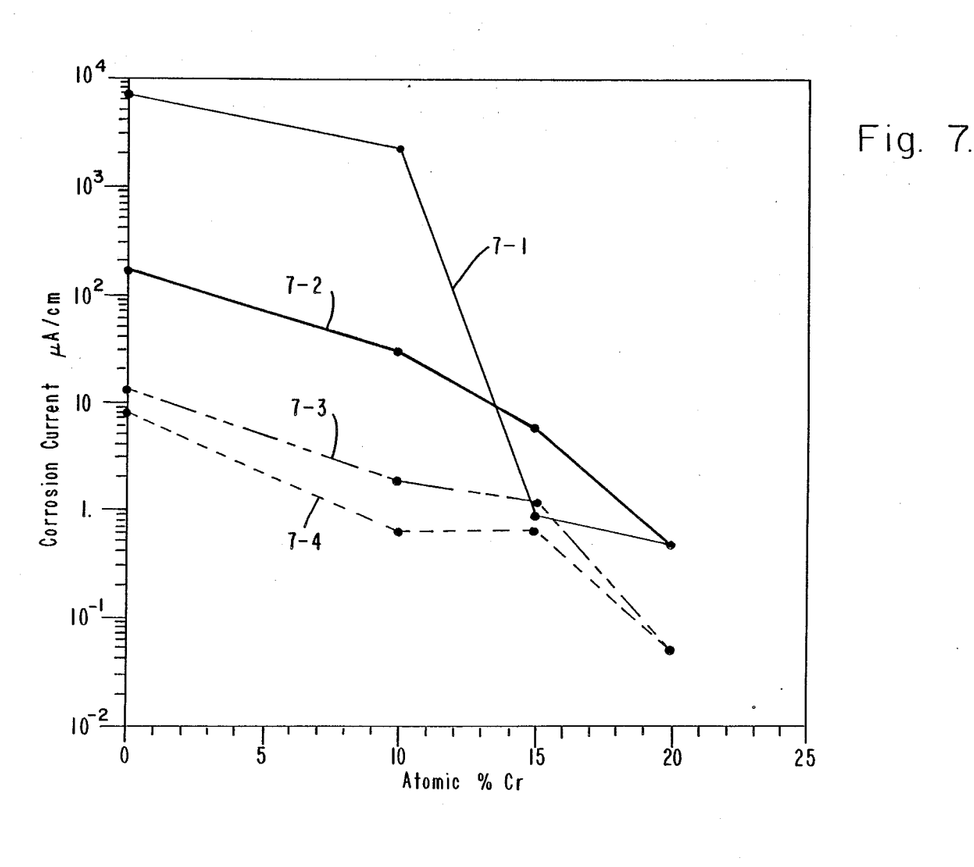
FIG. 7, on coordinates of $\mu A/cm^2$ and atomic percent, is a plot of the instantaneous corrosion current 60 seconds after immersion in the specified electrolyte as a function of Cr content for Co-Cr-Pt alloys containing 4 at% Pt.

In FIG. 7, the instantaneous corrosion current of Co-Cr-Pt alloys containing 4 at% Pt is plotted against at% of Cr for the four electrlytes listed above. The curves are related to the electrolytes as follows:

| 7-1 | 0.1N $H_2SO_4$ |
|---|---|
| 7-2 | pH 2 KCl |
| 7-3 | 0.4N $K_2SO_4$ |
| 7-4 | 0.4N NaCl. |

A rapid decrease in corrosion current is observed with increasing Cr content, especially for the more aggressive sulfate solution (0.1N $H_2SO_4$). The onset of chromium-like corrosion resistance with increased chromium content is less well defined for these cobalt alloys than for Fe-Cr alloys, occurring over a range from about 10 to 20 at% Cr. Atmospheric corrosion studies have found cobalt to be highly sensitive to sulfur-containing pollutants, as is well-known D. W. Rice et al., supra, a result consistent with these results in aqueous media.

The addition of Pt to metals or alloys which form stable oxides can improve corrosion performance by depolarizing (accelerating) the cathodic (reduction) reactions and consequently accelerate the formation rate of the protective film. It would not be expected and is not observed that the addition of Pt to Co improves corrosion resistance, since Co does not form a protective (passive) film. However, the addition of Pt to Co-Cr alloys with grater than 10 at% Cr does enhance the corrosion resistance of the alloy.

With regard to corrosion, one would like to add as much Cr as possible to gain the maximum corrosion benefit. For a magnetic recording alloy, ultimate limits are set by the loss of magnetic performance for high Cr content alloys. The ultimate limit for current generation recording media was found to be near about 20 at% Cr. The requirements for high performance media reduce this limit by an amount dependent on system design criteria.

The magnetic recording performance of the Co-Cr-Pt discs was evaluated by fabricating thin film discs with materials structure similar to that depicted in FIG. 1. Typical recording performance data, together with the corresponding magnetic properties are summarized in Table I. All recording data were obtained with the same head at the same separation between head and disc (about 6 microinches). The thin film inductive head was manufactured by Read-Rite Corporation (Milipitas, CA). The approximate dimensions of the head were 0.38 μm gap and 3 μm pole tips.

TABLE I

Representative magnetic and recording data for Co—Cr—Pt alloys.

Part 1

| Alloy | | | $H_c$ | $M_r t$ | | |
|---|---|---|---|---|---|---|
| Co | Cr | Pt | (Oe) | (emu/cm$^2$) | S | S* |
| 96 | — | 4 | 967 | 3.88 × 10$^{-3}$ | 0.89 | 0.90 |
| 86 | 10 | 4 | 1,100 | 3.07 | 0.93 | 0.93 |
| 81 | 15 | 4 | 1,040 | 2.96 | 0.93 | 0.89 |
| 81 | 15 (on glass) | 4 | * | * | * | * |
| 76 | 15 | 9 | 1,650 | 2.52 | 0.89 | 0.91 |
| 76 | 20 | 4 | 792 | 3.49 | 0.89 | 0.91 |

Part 2

| Alloy | | | TAA | R70 | D50 | OW | PW50 | SNR | |
|---|---|---|---|---|---|---|---|---|---|
| Co | Cr | Pt | (μV) | (%) | (kFPRI) | (dB) | (μm) | (@ 20,000) | NOISE |
| 96 | — | 4 | 525 | 24.8 | 27.3 | −25 | 1.15 | 28.5 | 13.5 |
| 86 | 10 | 4 | 490 | 30.3 | 30.9 | −29 | 0.90 | 32.3 | 14 |
| 81 | 15 | 4 | 430 | 29.4 | 30.0 | −30 | 0.93 | 32.5 | 8.2 |
| 81 | 15 (on glass) | 4 | 375 | 28.8 | 30.8 | −30 | 0.99 | 31.7 | 7.3 |
| 76 | 15 | 9 | 400 | 38.9 | 42.7 | −23 | 0.76 | 32.8 | 7.7 |
| 76 | 20 | 4 | 434 | 25.1 | 27.9 | −29 | 1.14 | 33.2 | 4.6 |

Notes
*Not measured
$H_c$ - Coercivity in Oersteds
$M_r t$ - remanence-thickness product in emu/cm$^2$
S - Remnant squareness
S* - Coercivity squareness
TAA - Track average amplitude (signal) for a complete revolution in μV at the head for a density of 1,800 flux reversals per inch (FRPI)
R70 - Recording density at 70% resolution where resolution is defined as the ratio of signal amplitude at frequency f divided by the amplitude at frequency f/2
D50 - Density in kFRPI at which the signal amplitude is reduced by 50%
OW - Overwrite (dB)
PW50 - Pulse width at 50% of peak maximum in μm
SNR - Ratio of signal amplitude at 20,000 FRPI to the square root of the maximum noise power in dB
NOISE - the ratio of the noise power to the square of $M_r t$ in units of V$^2$*cm$^2$/emu Several important results are evident from the data presented in Table I. First, Co-Cr-Pt alloys are suitable for high density (>30,000 FRPI) magnetic recording applications. Second, improvements in signal-to-noise ratio (SNR) of 3 to 4 dB over Co-Pt were typical for Co-Cr-Pt alloys. And third, the recording performance of the Co-Cr-Pt magnetic materials is found to be nearly independent of the substrate material. As shown in Table I, the recording properties of Co-15 at% Cr-4 at% Pt thin film disc materials structure deposited on NiP-plated aluminum and smooth glass substrates are found to be very similar.

In selecting a suitable disc materials system for high density recording, it is essential that the noise from the recording material be as low as possible, and hence a high signal-to-noise ratio (SNR), for the system. The source for the transition noise is primarily due to non-coherent magnetization fluctuation in the recorded transition. As is evident from Table I, in the Co-Cr-Pt materials system of the invention, a significant reduction in the normalized intrinsic transition noise, defined as the ratio of total noise power to the $(M_r t)^2$, was observed for the alloys with greater than about 10 at% Cr. This reduction in noise was an unexpected result of the additions of Cr to Co-Pt. The improvements in noise performance required Cr additions greater than about 10 at%. Since the recorded transition noise of the Co-Cr-Pt material is lower than that of the Co-Pt system, and the fact that noise further decreases with Cr addition to Co-Cr-Pt alloys, it is believed that lower noise in the Co-Cr-Pt alloy films is due to segregation of Cr to grain boundaries, which tend to decrease the magnetostatic coupling between the grains and apparently help lower the transition noise. The exact noise mechanism in Co-Cr-Pt alloys is not yet known.

Generally, for a given head geometry and flying height, the usable (>70% resolution) recording density is limited by the ability of disc media to sustain a sharp magnetic transition. An increase in coercivity and decrease in magnetization-thickness product yields a sharper magnetic transition and hence recording density. As shown in Table I, a Co-15 at% Cr-9 at% Pt thin film disc materials structure with a coercivity of about 1,650 Oe and a remanent magnetization-thickness product ($M_r t$) of about $25 \times 10^{-3}$ emu/cm$^2$ achieves a linear density of about 39,000 FRPI at a resolution of about 70%. This excellent recording performance observed in Co-Cr-Pt alloys is primarily due to its ability in obtaining a very high coercivity while maintaining a high M-H loop squareness (S, S*) and good M-H loop shape characteristics. These capabilities combined with good corrosion resistance properties, makes the Co-Cr-Pt materials system extremely attractive for applications in very high density longitudinal magnetic recording.

In summary, a thin film disc system has been disclosed comprising Co-Cr-Pt, within the composition limits set forth, that provides excellent recording performance, together with superior corrosion resistance for suitable high linear density longitudinal magnetic recording applications. The coercivity is controlled primarily by the alloy's Pt content. Coercivities greater than 2,000 Oe, together with high M-H loop squareness, can be easily obtained for ternary Co-Cr-Pt films with Cr contents ranging from about 10 to 20 at%. $M_r t$ can be varied by adjusting alloy film thickness or by changing the Cr or Pt content of the alloy within a desired range. In addition, Cr underlayer thickness can be varied to further tune the coercivitiy of the Co-Cr-Pt film deposited on top. Hence, independent control over coercivity ($H_c$) and magnetization-thickness product ($M_r t$) can be obtained to match writing capabilities of recording heads to achieve high linear density in longitudinal magnetic recording applications.

The corrosion resistance of Co-Cr-Pt films is controlled primarily by Cr content and increases with higher Cr in the Co-Cr-Pt alloys. Corrosion performance is dramatically improved for alloys with greater than about 10 at% Cr, with the improvement largely saturating at about 20 at% Cr. An alloy film containing 20 at% evidences corrosion resistance behavior similar to pure Cr.

The Co-Cr-Pt discs offer superior recording performance over other materials systems. Low transition noise resulting in high (>33 dB; see Table I) signal-to-noise ratio (SNR) of Co-Cr-Pt/Cr discs is obtained by adding Cr to Co-Pt. Increasing the Cr content lowers the disc media transition noise, which results in higher SNR for a given recording system.

In the Co-Cr-Pt disc materials system, it is possible to achieve very high density (>38k FRPI; see Table I), together with high SNR and superior corrosion resistance by controlling both Pt and Cr content in the ternary Co alloy film. Since high coercivities can be obtained essentially independent of the ternary alloy's Cr content, it is possible to optimize almost independently the Co-Cr-Pt disc's recording performance while providing superior corrosion resistance.

Thin film discs employing other materials systems typically require a thin second Cr layer on top of the magnetic layer to provide good adhesion between the magnetic layer and a wear layer comprising carbon. In the present invention, the need for a second Cr adhesion layer is optional, since Cr in the Co-Cr-Pt magnetic layer can provide adequate adhesion to the carbon wear layer. Other carbide-forming elements such as Ti, Zr, Hf, W, and the like, can be substituted in place of chromium to promote adhesion. Reducing a four-layer thin film disc structure to a three-layer structure can result in lower disc manufacturing costs.

INDUSTRIAL APPLICABILITY

The magnetic recording medium/non-magnetic underlayer combination is useful in high density longitudinal magnetic recording systems, providing improved wear properties and corrosion resistance.

Thus, there has been disclosed a magnetic alloy system suitable for magnetic recording applications. Various changes and modifications of an obvious nature will ocur to those of ordinary skill in this art, and all such changes and modifications are considered to fall within the scope of the invention as defined by the appended claims.

What is claimed is:

1. A magnetic film of an alloy of cobalt, platinum, and chromium formed on a layer of chromium, said layer of chromium having a thickness of about 1,500 to 3,000 Å, and consisting essentially of about 1 to 20 at% platinum, about 10 to 20 at% chromium, and the balance cobalt, in which the coercivity of said film is primarily proportional to the percentage of platinum in said alloy and the saturation magnetization-thickness product of said alloy is primarily proportional to Cr and Pt content and the film thickness thereof, said alloy evidencing improved corrosion resistance and signal-to-noise ratio "compared to a cobalt-platinum alloy containing no chromium".

2. The magnetic film of claim 1 wherein said platinum concentration ranges from about 3 to 10 at%.

3. The magnetic film of claim 2 wherein said platinum concentration is about 4 at%.

4. The magnetic film of claim 1 wherein said chromium concentration ranges from about 14 to 16 at%.

5. The magnetic film of claim 4 wherein said chromium concentration is about 15 at%.

6. The magnetic film of claim 1 wherein said film thickness ranges from about 200 to 1,200 Å.

7. The magnetic film of claim 6 wherein said film thickness ranges from about 500 to 1,000 Å.

8. The magnetic film of claim 7 wherein said film is about 600 Å thick.

9. The magnetic film of claim 1 wherein said chromium layer is about 2,000 Å thick.

10. A magnetic recording disc comprising a substrate member having a layer of chromium formed on said substrate, a magnetic layer of cobalt, platinum, and chromium formed on said chromium layer and consisting essentially of about 1 to 20 at% platinum, about 10 to 20 at% chromium, and the balance cobalt, said chromium layer interacting with said magnetic layer to permit adjustment of the magnetic and noise properties thereof, and a wear layer disposed over said magnetic layer, said magnetic layer evidencing improved corrosion resistance and signal-to-noise ratio "compared to a cobalt-platinum alloy containing no chromium".

11. The disc of claim 10 wherein said substrate consists essentially of a member selected from the group consisting of aluminum, NiP-coated aluminum, alumina-coated aluminum, glass, ceramic, and silicon.

12. The disc of claim 10 wherein said chromium layer ranges in thickness from about 1,500 to 3,000 Å, said magnetic layer ranges in thickness from about 200 to 1,200 Å, and said thin wear layer ranges in thickness from about 200 to 800 Å.

13. The disc of claim 12 wherein said magnetic layer ranges in thickness from about 500 to 1,000 Å, and said wear layer ranges in thickness from about 200 to 500 Å.

14. The disc of claim 10 wherein said wear layer comprises a material selected from the group consisting of carbon, and the oxides, nitrides, and carbides of silicon, titanium, tantalum, niobium, hafnium, zirconium, vanadium, molybdenum, and tungsten.

15. The disc of claim 10 further provided with an adhesion layer interposed between said magnetic layer and said wear layer.

16. The disc of claim 15 wherein said adhesion layer comprises a material selected from the group consisting of chromium, titanium, zirconium, hafnium, vanadium, molybdenum, and niobium.

17. The disc of claim 15 wherein said adhesion layer ranges in thickness up to about 500 Å.

18. The disc of claim 10 wherein said magnetic layer consists essentially of about 3 to 10 at% platinum, 14 to 16 at% chromium, and the balance cobalt.

19. A magnetic recording disc comprising a substrate member consisting essentially of NiP-coated aluminum having a layer of chromium ranging in thickness from about 1,500 to 3,000 Å formed on said substrate, a magnetic layer ranging in thickness from about 500 to 1,000 Å and consisting essentially of about 1 to 20 at% platinum, about 10 to 20 at% chromium and the balance cobalt formed on said chromium layer, said chromium layer interacting with said magnetic layer to permit adjustment of the magnetic and noise properties thereof, and a wear layer ranging in thickness from about 200 to 500 Å and consisting essentially of carbon disposed over said magnetic layer, said magnetic layer evidencing improved corrosion resistance and signal-to-noise ratio "compared to a cobalt-platinum alloy containing no chromium".

20. The disc of claim 19 wherein said chromium layer is about 2,000 Å thick, said magnetic layer is about 600 Å thick, and said wear layer is about 400 Å thick.

21. The disc of claim 19 wherein said magnetic layer consists essentially of about 3 to 10 at% platinum, 14 to 16 at% chromium, and the balance cobalt.

22. The disc of claim 21 wherein said magnetic layer consists essentially of about 4 at% platinum, 15 at% chromium, and the balance cobalt.

23. A method of reducing noise and improving corrosion resistance in a magnetic recording disc comprising a substrate, a chromium layer ranging in thickness from about 1,500 to 3,000 Å and formed on said substrate, a magnetic layer formed on said chromium layer, and a wear layer formed over said magnetic layer, comprising forming as said magnetic layer a magnetic composition consisting essentially of cobalt, chromium, and platinum containing from about 10 to 20 at% chromium.

* * * * *